Dec. 8, 1942.  C. D. PETERSON ET AL  2,304,375
CHANGE SPEED TRANSMISSION MECHANISM
Filed April 11, 1940    2 Sheets-Sheet 2
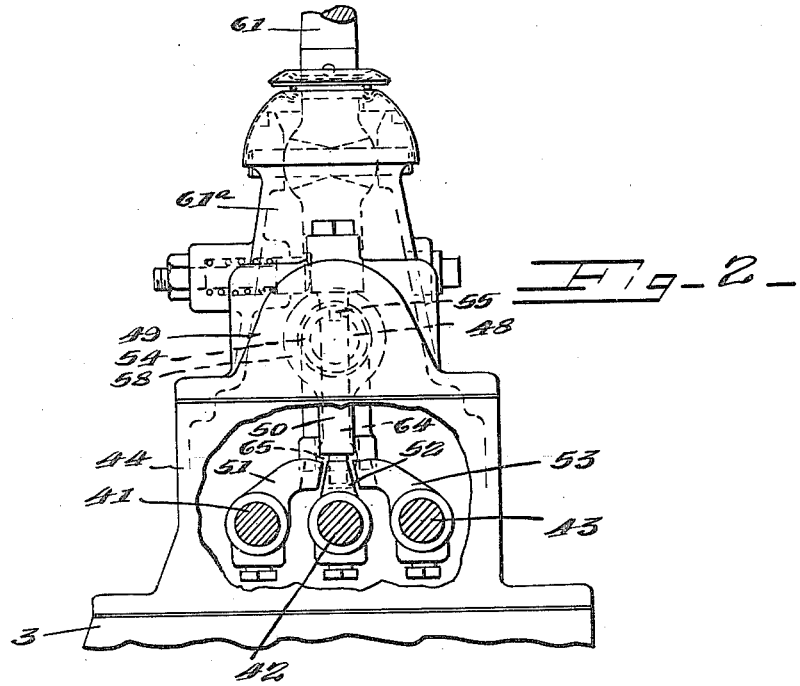
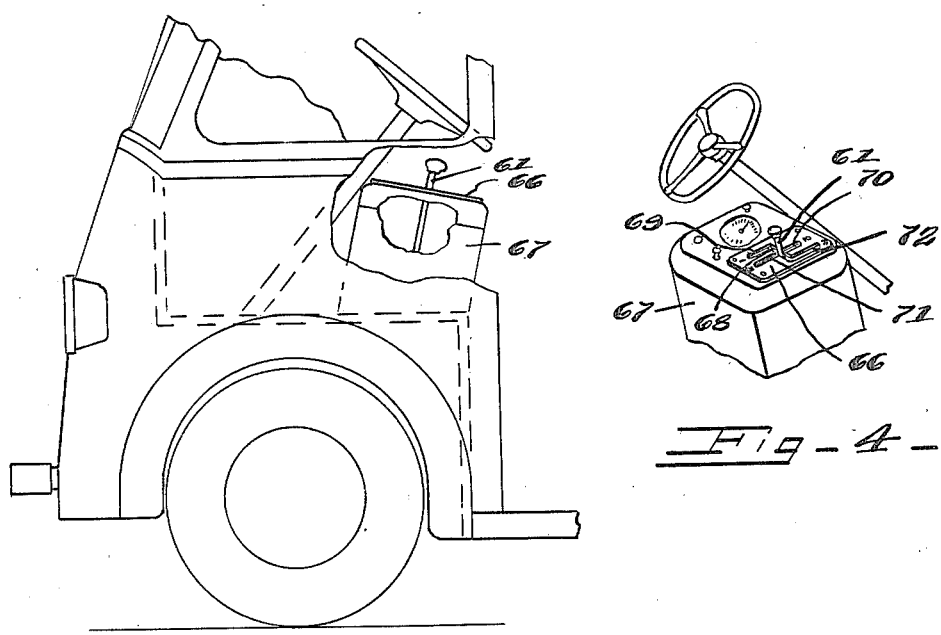
INVENTORS.
Carl D. Peterson & Albert H. Weimel
BY Bodell & Thompson
ATTORNEYS.

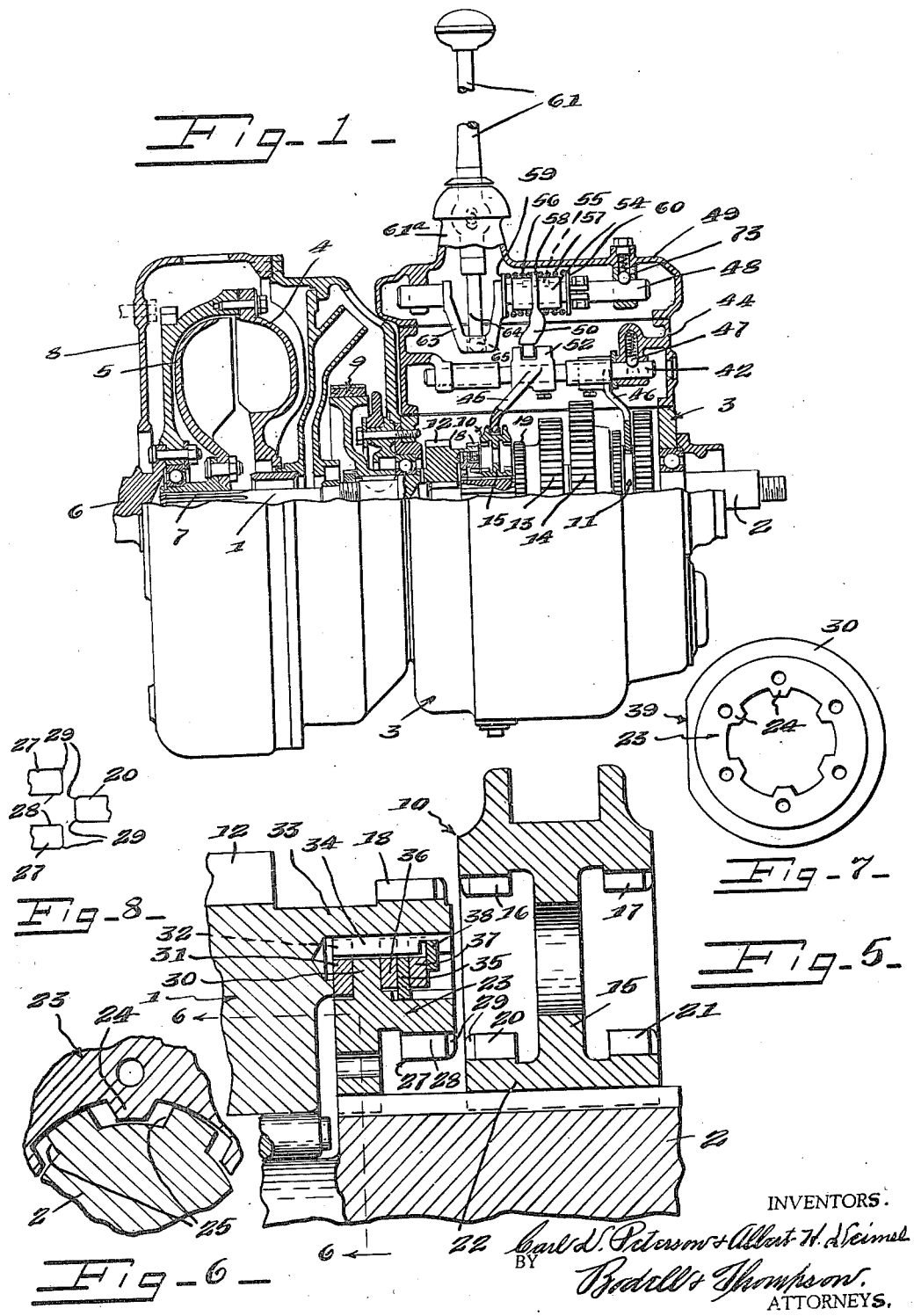

Patented Dec. 8, 1942

2,304,375

UNITED STATES PATENT OFFICE 2,304,375

CHANGE SPEED TRANSMISSION MECHANISM

Carl D. Peterson and Albert H. Deimel, Toledo, Ohio

Application April 11, 1940, Serial No. 329,161

4 Claims. (Cl. 74—473)

This invention relates to transmission mechanisms for motor vehicles, and in one aspect thereof, to transmission mechanisms embodying a fluid fly wheel and a change speed transmission gearing embodying synchronizing clutches, that is, clutches embodying means, as balking rings, for preventing complete engagement of the toothed jaw sections until the speeds of the input and output shafts of the transmission have been synchronized or the speeds thereof cross. In transmission mechanisms embodying balking ring clutches, the engagement of two clutch members or sections is prevented or blocked, until the instant the speeds thereof cross, when the speeds cross and unlocking takes place, it is necessary that the shifting-in operation be completed at the instant the speeds cross. When the shifting force or prime mover is hand pressure, the operator might not follow through fast enough and the shift would not be completed at the time the speeds cross; hence clashing would result. If, however, the shift is completed when the speeds cross, under spring pressure, the shiftable clutch member or section will snap into engagement with the companion clutch section, when the speeds cross and the shiftable section is unlocked by the balking ring. The invention therefore has for its object resilient follow-up means, as a spring, by which the shifting lever of the clutch selecting and shifting mechanism can be operated to nearly full position, when the selected clutch is blocked from complete shifting movement, preliminary to the synchronizing or crossing of the speeds and for automatically completing the shifting movement instantly when the speeds are synchronized or cross, providing the operator holds the operating lever in its nearly complete shifted position, until the speeds synchronize or cross and the clutch engages.

It further has for its object shifting mechanism including a plurality of shiftable members, as axially movable shift rods connected to the shiftable clutches, and an additional shift rod having an axial movement and a rocking movement, a selecting and shifting finger rocking with and also shifting axially of the additional rod, to select one of the former rods and shift the same together with the yielding means, as springs, which permit axial shifting of the additional rod in either direction from central or neutral position, while the selected shift rod and the clutch connected thereto is being blocked from complete shifting, and to re-act when the blocking force to complete shifting is removed by the synchronization or crossing of the speeds of the two clutch elements to be clutched together.

It also has for its object an improved form of the balking ring of the balking ring clutch.

The invention consists in the novel features and in the combinations and constructions hereinafter set forth and claimed.

In describing this invention, reference is had to the accompanying drawings in which like characters designate corresponding parts in all the views.

Figure 1 is a longitudinal sectional view, partly in elevation, of a transmission mechanism embodying this invention.

Figure 2 is an enlarged fragmentary elevation, partly broken away, of parts seen in Figure 1.

Figure 3 is a fragmentary diagrammatic view showing the position of the operating lever in which the handle end has the long throw applied to vehicles as door to door delivery trucks in which the operator stands when operating the vehicle.

Figure 4 is a fragmentary perspective view showing the index plate applied to any convenient part of the automobile body of a door to door delivery truck.

Figure 5 is a fragmentary longitudinal sectional view of the balking ring clutch shown in Figure 1.

Figure 6 is a fragmentary view on line 6—6, Figure 5.

Figure 7 is an elevation on a reduced scale of the balking ring.

Figure 8 is a diagrammatic operation view of the balking ring and balking teeth on the shiftable clutch section.

The invention is here shown as embodied in a transmission mechanism including a hydraulic coupling wherein synchronizing or balking ring clutches are necessary or highly desirable.

I designates the input shaft and 2 the output shaft of a change speed transmission gearing, these being capable of being connected in direct drive relation and also in indirect drive relations through gears on the input and output shafts, and on a counter shaft, not shown, the gearing being located in the usual gear box 3.

4, 5 designate, respectively, the impeller and runner elements of a fluid fly wheel or hydraulic coupling, these being mounted respectively on a drive or engine shaft 6 and on the input shaft 1, the runner element being splined at 7 on the input shaft 1, and the impeller element being mounted on the drive shaft 6 and in the form of a housing enclosing the runner element. The hydraulic coupling or fluid fly wheel is enclosed in a suitable casing 8 abutting against the front end of the gear box. On the input shaft 1 between the hydraulic coupling and the gear box is also mounted a brake 9. The brake is used in connection with balking ring clutches to effect a crossing of the speeds, particularly when a shift is being made from a standing start from neutral. The brake 9 first operates to stop the input shaft 1 and then rotate it in a reverse direction. When the transmission gear is in neutral, and the vehicle in which it is installed, stationary, the runner element 5 drifts or idles slowly, and before making the shift, the brake is operated to stop the runner element and rotate it backward, as is well understood.

The brake per se forms no part of the invention.

The transmission gearing includes clutch elements, preferably of the balking ring type, for connecting the input and output shafts together through different gear ratios. 10 and 11 designate the clutch elements. The clutch element 10 is shiftable to the left from neutral for clutching the shafts 1, 2 together in direct drive relation and to the right from neutral to connect the input and output shafts in indirect drive including the gears 12 and 13, which mesh with gears on the counter shaft not shown. The clutch element 11 is shiftable to the left from starting position to clutch the gear 14 to the transmission shaft for first speed indirect drive through gears 12 and 14 and the counter shaft and gears thereon meshing with the gears 12 and 14. Reverse speed is, in the gearing here shown, established through another clutch, not shown.

The clutches 10 and 11 are of the balking ring type. The clutch 10, which is a double clutch, is illustrated in Figure 5, this being shiftable in opposite directions from neutral and including a shiftable clutch section 15 splined on and shiftable axially of the output shaft 2 and provided with jaw or toothed clutch faces 16, 17 on opposite sides thereof, which are shiftable into engagement respectively with clutch teeth 18 and 19 provided on a complementary clutch element, as the clutch gear 12, and on the element or clutch gear 3, respectively. The clutch teeth 16, 17 are here shown as in the form of internal teeth and the teeth 18, 19 as in the form of external teeth. The toothed element or section 16 is also provided with blocking or balking teeth or projections 20 and 21 on opposite sides thereof for coacting with the balking ring, these teeth 20, 21 being in the form of external teeth on the hub 22 of the section 15.

23 designates the balking ring which is rotatable with the element or section 15 and also relatively thereto, within limits, it being here shown splined on the output shaft 2 and having internal projections or teeth 24, which are of less width than the spaces 25 between the splines on the output shaft, in order that the balking ring may have a limited rocking movement in opposite directions from central position, an amount determined by the width of the spaces 25. The balking ring 23 is also provided with teeth 27 are shown as internal teeth providing passages for coacting with the balking teeth 20. The balking teeth 20 slidably fit the passages 28, and the ends of the teeth 20 and 27 are square but chamferred at 29 merely to avoid breaking off the teeth at the corners (Figure 8). The teeth 21 cooperate with similar teeth 27 of a balking ring similar to the balking ring 23 when the clutch section 15 is shifted to the right from neutral preliminary to the clutch teeth 17 inter-engaging with the clutch teeth 19 of the gear 13.

The balking ring has an annular flange portion 30 providing annular recesses on opposite sides thereof, one side of this flange 30 coacting with a friction ring 31 rotatable with the gear 12 and interlocked by peripheral teeth 32 in grooves formed with internal teeth 34 on the gear 12, or an extension 33 thereof forming the clutch portion of the gear 12. The periphery of the flange 30 thrusts radially against the surface at the ends of the teeth 34 under the centrifugal force of the balking ring.

35 is a friction ring rotatable with the balking ring 23 and located in the recess on the opposite side of the flange 30 to that on which the friction ring 31 is mounted, the friction ring 35 being interposed between washers or friction rings 36, 37 rotatable with the gear 12.

38 is a lock or retaining ring interlocked in notches in the teeth 34. The balking ring 23 is eccentrically weighted, as seen in Figure 7, so as to have a slight radial throw, it being here shown as having one side cut away at 39.

The engagement of the balking ring with the friction rings 31, 36 and 38 creates enough frictional drag for the balking ring to be carried by the driving member or clutch gear 12 in one direction or the other to take up the clearance provided by the spaces 26 between the projections of the balking ring and the splines of the shaft 2. Therefore, when a shift is being made, it is necessary to decelerate the gear 12 by decelerating the engine, if the gear 12 is rotating faster than the shaft 2 or to accelerate the engine and the gear 12 in case the shaft 2 is acting as a driver, as when coasting, in order to unlock the balking ring.

With the fluid fly wheel, the runner element 5 idles slowly when the vehicle is at a standstill, and hence the transmission gear in neutral. Before a shift may be made, it is necessary to cross the speeds. This is done by applying the brake 9 and first stopping the shaft 2 and then rotating the shaft in the reverse direction to effect crossing of the speeds. Before the speeds cross in any case, the teeth or projections 20 of the clutch section 15 abut against the balking ring on one side or the other of the passages 28 (Figure 8) until the speeds are crossed and the balking ring centers in the splines of shaft 2 in the position shown in Figure 6, and hence alines the passages 28 with the balking teeth 20 of the section 15. When a shift is being made, while the vehicle is in motion, the eccentric balking ring, because of its eccentricity, engages with enough friction, due to the centrifugal weight to overcome the inertia of the balking ring, so that at all speeds or accelerations and decelerations, the balking ring is held or positioned in correct relation, dependent only upon the relative speeds of the clutch elements to be clutched together. Otherwise, due to rapid acceleration or deceleration, the balking ring would get out of its correct position, so that when attempting to engage the toothed clutch sections, the balking ring would either be damaged by violently snapping back or be thrown under its momentum to unlocked position before the speeds cross, and hence cause the clutch teeth to clash.

The shifting means, working in conjunction or correlated with the balking ring, comprises a plurality or group of shiftable members, here shown as axially movable shift rods arranged side by side or parallel and close together, an additional member or rod having an axial shifting movement and a lateral selecting movement, a selecting and shifting lever having a lateral selecting movement to rock the additional rod and a fore-and-aft movement to shift the same, and means for yieldingly transmitting the motion of the additional rod to the additional shift rod, and thereby permitting full shifting operation of the shifting lever, while the clutch is being blocked by the balking ring from being completely shifted into engaged position, and for completing the shifting of the selected shift rod and clutch section, when the speeds synchronize or cross.

41, 42, and 43 designate the shift rods suitably mounted in the boxlike cover 44 of the gear box open at its top and bottom and mounted on the gear box in place of the conventional cover in which the shift rods are mounted. The shift rods 41 and 42 have forks 45 and 46 connected respectively to the clutches 10 and 11, and the rod 43 has a similar fork connected to effect reverse speed, these rods being held in neutral and in shifted position by the usual spring-pressed poppets 47.

48 designates a prime mover for the shift rods, this being an additional rod which is suitably mounted in a cap or cover 49 for the cover 44 above the central shift rod or at one side of the plane of the group of rods.

50 designates a selecting and shifting finger operated by the rocking movement of the rod 48 into the notch of any one of the selector blocks 51, 52, 53 of the rods 41, 42 and 43, when all rods are in neutral, and operable by the axial or fore-and-aft movement of the additional rod 48 to shift axially relatively thereto. The finger is here shown as provided on the hub 54 slidably keyed at 55 to the additional rod 48. The sliding movement of the additional rod 48 is transferred to the finger 50 through yielding means, as oppositely acting springs 56, 57 encircling the hub 54 and each thrusting at its inner end against a collar 58 on the hub 54 and at its other end against an abutment or collar 59 or 60 on the additional rod 48.

61 designates the selecting and shifting lever, this being suitably mounted in a tower 61ª on the cover 49 to have a lateral selecting movement and a fore-and-aft shifting movement, and it is here shown as connected to the additional rod 48 to rock the same to cause the finger 50 to select one of the rods 41, 42 or 43 and to move fore-and-aft to shift the selected rod. The additional rod 48 is formed with a crank 63 and the arm 64 of the lever 61 below its pivot point is connected to the crank as by a ball-and-socket joint at 65. The crank 63, as here shown, extends radially below the additional rod 48 toward the group of rods or is arranged on the opposite side of the axis of the additional rod from that on which the axis of the lever 61 is located.

Both the rocking movement and the axial movement of the additional rod 48 is such that the finger will select and shift the rods located and spaced as in a conventional change speed transmission gearing, so that by supplying the cover for the conventional cover of a transmission gearing and the cap 49 for the cover 44, this shifting mechanism may be applied to a conventional transmission gearing.

The gearing is particularly designed for door to door delivery wagons, where the driver stands when driving, and hence a particularly long or high gear shifting lever is necessary, so that the handle end thereof has a particularly long throw.

In Figure 3, the front portion of such a delivery wagon is shown, in which the handle end of the lever 61 extends through an index or guide plate 66 mounted on any convenient portion of the body of the vehicle, where the driver may readily see in which gear he is located, and as here shown, the index plate 66 is, in the type of vehicle here shown, mounted on the upper end of a hollow pedestal 67, the top of which serves as an instrument board.

In operation, assume the operator is starting from a standing start. He shifts the handle end of the lever 61 laterally, through the cross-over slot 68 of the index plate 66 and rearwardly into the first speed slot 69. The lateral movement along the slot 68 causes the additional rod 48 to be rocked through the crank 63 and the selecting finger 50 to be likewise rocked to select the rod 41. The movement of the handle end of the lever 61 in the slot 69 moves the rod 41 forwardly, causing the clutch 11 to be engaged to produce first speed forward. This movement compresses the spring 57 against the collar 58 of the hub 54 of the finger 50, because the clutch 11 is prevented from being engaged by the balking ring 11 until the speeds are crossed. The operator crosses the speeds, in this instant, by operating the brake 9, as before described, whereupon the spring reacts in a forward direction and completes the shifting of the rod 41 to the left in Figure 1. When a shift is to be made into second speed forward, the handle end of the lever 61 is moved forwardly in the slot 69 through the cross-over slot 68, and then forwardly in the slot 70. This movement first selects the rod 42 and then shifts the additional rod 48 compressing the spring 56 which reacts when the speeds are synchronized and the balking ring unlocks by decelerating the engine under ordinary conditions. In the shift into third speed forward or direct drive, the handle end of the lever 61 is moved from the slot 70 across the cross-over slot 68 and rearwardly into the third speed slot 71, thus moving the additional rod 48 forwardly compressing the spring 57 which reacts when the balking ring 23 is unlocked by the synchronization or crossing of the speeds of the shafts 1, 2 and permits the clutch teeth 16 and 18 to inter-engage.

For reverse speed, the handle end of the lever 61 is moved to the right end of the cross-over slot 68 and pushed upwardly into the slot 72.

For facilitating the inter-engagement of the jaws or teeth of coacting clutches, the teeth are cut alternately long and short, as seen in Figure 5. The additional rod 48 is provided with a spring pressed support poppet 73 for holding it in neutral position only, and not in shifted position, it being intended that the operator hold the handle end of the lever 61 in shifted position, until the spring 56 or 57 reacts when the balking ring unlocks. The poppets 47 however hold the shifted shift rod in neutral and in shifted position.

By this mechanism, a particularly simple and efficient construction is provided for working in conjunction with balking ring clutches and also owing to the additional rod 48 and cap 49 and cover 44, the shifting mechanism having a long operating handle is readily adapted to conventional change speed gearing.

What we claim is:
1. In a transmission mechanism including a change speed transmission gearing having a plu- rality of shiftable elements to effect different gear changes, the combination of a plurality of shiftable members having a fore-and-aft movement and connected to the said shiftable elements respectively, a rod having an axial shifting movement and a rocking selecting movement, a selecting finger operated thereby and operable to select any one of said members during the rocking movement and to shift the same during the axial movement, a selecting and shifting lever connected to the additional rod and having a lateral selecting movement to rock said rod, and a fore-and-aft movement to shift the rod axially, and spring means arranged to transfer the axial shifting movement of the rod to said finger.

2. In a transmission mechanism including a change speed transmission gearing having a plurality of shiftable clutches to effect different gear changes, the clutches including jaw sections for coacting with complemental jaw sections on the parts to be clutched together, and means for balking the engagement of the jaw section of each shiftable clutch with its companion clutch element until the speeds synchronize; the combination of axially movable shift rods connected respectively to the clutches, an additional rod having rocking selecting movement and a fore-and-aft shifting movement shiftable in opposite directions from central position, a shifting finger carried by and coacting with the former rods, a lever having a lateral selecting movement and a fore-and-aft shifting movement connected to the additional rod to rock and shift the same, and spring means interposed between the additional rod and the selecting and shifting finger permitting complete fore or aft movement of the operating lever and the additional rod when the engagement of the selected clutch is prevented by the balking means and completing the shifting when the balking means is operated by the synchronization of the speeds to permit complete shifting of the selected clutch.

3. In a transmission mechanism including a conventional change speed gear box, gearing therein including shiftable members to effect different gear changes, and shifting mechanism including a group of axially shiftable rods arranged side by side, a second box open at its top and bottom and in which the rods are slidably mounted, the second box being mounted on the gear box in place of the conventional cover, an additional rod, a selecting and shifting finger operable thereby and selectively coacting with any one of the former rods, the additional rod having a rocking selecting movement, and an axial shifting movement, a cover in which the additional rod is mounted, the cover being mounted on said second box, and a selecting and gear shifting lever pivotally carried by said cover and having an arm connected to the additional rod to rock and shift the same.

4. In a transmission mechanism including a conventional change speed gear box, gearing therein including shiftable members to effect different gear changes, and shifting mechanism including a group of axially shiftable rods arranged side by side, a second box open at its top and bottom and in which the rods are slidably mounted, the second box being mounted on the gear box in place of the conventional cover, an additional rod, a selecting and shifting finger operated thereby and selectively coacting with any one of the former rods, the additional rod having a rocking selecting movement, and an axial shifting movement, a cover in which the additional rod is mounted, the cover being mounted on said second box, a selecting and gear shifting lever pivotally carried by said cover and having an arm connected to the additional rod to rock and shift the same, the additional rod being formed with a crank and the arm of the lever being connected to the crank, the crank and the arm of the lever being so arranged and of such radii that the rocking movement of the additional rod is such as to effect the selecting of any one of the group of rods arranged in the conventional manner in a transmission gearing and to shift the same axially.

CARL D. PETERSON.
ALBERT H. DEIMEL.